US010836383B2

(12) United States Patent
Ersal et al.

(10) Patent No.: US 10,836,383 B2
(45) Date of Patent: Nov. 17, 2020

(54) COLLISION IMMINENT STEERING CONTROL SYSTEMS AND METHODS

(71) Applicant: The Regents of The University of Michigan, Ann Arbor, MI (US)

(72) Inventors: Tulga Ersal, Novi, MI (US); Jeffrey L. Stein, Ann Arbor, MI (US); John Wurts, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 159 days.

(21) Appl. No.: 15/971,318

(22) Filed: May 4, 2018

(65) Prior Publication Data

US 2019/0337507 A1 Nov. 7, 2019

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/20* (2013.01); *B60W 30/095* (2013.01);
(Continued)

(58) Field of Classification Search
CPC ......... B60W 2554/00; B60W 2530/20; B60W 30/09; B60W 30/095; B60W 10/20; G05D 1/0212; G01B 2219/31003; G01B 2219/36356; G01B 2219/36468; G01B 2219/39082; G01B 2219/39091; G01B 2219/40339; G01B 2219/40476; G01B 2219/49141; G01B 2219/49143; G01B 2219/49157; G01B 19/31; G01B 19/33; G01B 19/37; G01B 19/406;
(Continued)

(56) References Cited

U.S. PATENT DOCUMENTS 7,085,637 B2 8/2006 Breed
7,124,027 B1 10/2006 Ernst, Jr.
(Continued)

OTHER PUBLICATIONS

Nikou, A., et al., "A Nonlinear Model Predictive Control Scheme for Cooperative Manipulation with Singularity and Collision Avoidance", Nov. 15, 2017, 11 pages.
(Continued)

*Primary Examiner* — Anthony R Jimenez
(74) *Attorney, Agent, or Firm* — Quarles & Brady LLP (57) ABSTRACT

A vehicle has a steering mechanism coupled to a wheel of the vehicle. The steering mechanism is adjustable to alter a vehicle trajectory. The vehicle also comprises a collision imminent steering (CIS) control system. The collision imminent steering control system includes a controller in electrical communication with the steering mechanism and is configured to adjust a steering sequence of the steering mechanism to alter the vehicle trajectory when an obstacle is detected at a distance from the vehicle less than a calculated safe braking distance. The controller simultaneously calculates a predicted optimal vehicle path around the obstacle and a steering sequence determined to follow the predicted optimal vehicle path around the obstacle using feedback received by the controller.

21 Claims, 7 Drawing Sheets

(51) Int. Cl.
G05D 1/02 (2020.01)
B60W 10/20 (2006.01)
(52) U.S. Cl.
CPC ....... *G05D 1/0212* (2013.01); *B60W 2530/20* (2013.01); *B60W 2554/00* (2020.02)
(58) Field of Classification Search
CPC ....... G01B 19/4061; G01B 15/00; G01S 5/00; G01S 13/00; G01S 13/06; G01S 13/93; G01S 13/931; G01S 13/93185; G01S 15/93; G01S 17/04; G01S 17/06; G01S 19/40; G01S 19/41; G01S 19/42; G01P 3/00; G01P 3/02; G01C 1/00; G01C 21/00; G01C 21/12; G01C 21/10; G01C 21/34
See application file for complete search history.

(56) References Cited

U.S. PATENT DOCUMENTS

| | | | | |
|---|---|---|---|---|
| 7,292,924 | B2* | 11/2007 | Milot | B60C 23/00 701/36 |
| 8,543,261 | B2 | 9/2013 | Anderson | |
| 8,626,431 | B2* | 1/2014 | Okita | B60W 30/12 701/301 |
| 8,849,515 | B2 | 9/2014 | Moshchuk | |
| 9,514,647 | B2* | 12/2016 | Moshchuk | B60W 30/09 |
| 2008/0065328 | A1* | 3/2008 | Eidehall | B60W 30/0956 701/301 |
| 2011/0035086 | A1* | 2/2011 | Kim | G05D 1/0217 701/23 |
| 2014/0032049 | A1 | 1/2014 | Moshchuk | |
| 2015/0158528 | A1 | 7/2015 | Moshchuk | |

OTHER PUBLICATIONS

Park, J.-M., et al., "Obstacle avoidance of autonomous vehicles based on model predictive control," Proceedings of the Institution of Mechanical Engineers, Part D: Journal of Automobile Engineering, vol. 223, No. 12, pp. 1499-1516, 2009.
Abbas, M., et al., "Obstacle avoidance in real time with nonlinear model predictive control of autonomous vehicles," 2014 IEEE, CCECE 2014 Tronto, Canada, pp. 1-6.
Kapania, N., et al., "Design of a feedback-feedforward steering controller for accurate path tracking and stability at the limits of handling," Vehicle System Dynamics, vol. 53, No. 12, pp. 1687-1704, 2015.
Liu, J., et al., "A multistage optimization formulation for mpc-based obstacle avoidance in autonomous vehicles using a lidar sensor," ASME 2014 dynamic systems and control conference. American Society of Mechanical Engineers, 2014, pp. 1-10.
Liu, J., et al., "An mpc algorithm with combined speed and steering control for obstacle avoidance in autonomous ground vehicles," Dynamic Systems and Control Conference, Ohio, 2015, 10 pages.
Chakraborty, I., et al., "Time-optimal vehicle posture control to mitigate unavoidable collisions using conventional contol inputs," American Control Conference (ACC), 2013. IEEE, 2013, pp. 2165-2170.
Anderson, Sterling J., Steven C. Peters, Karl lagnemma "Design and Development of an Optimal-Control-Based Framework for Trajectory Planning, Threat Assessment, and Semi-autonomous Control of Passenger Vehicles in Hazard Avoidance Scenarios" Published in ISRR 2009, pp. 1-16.
Liu J., et al., "A study on model fidelity for model predictive control-based obstacle avoidance in high-speed autonomous ground vehicles," Vehicle System Dynamics, vol. 54, No. 11, pp. 1629-1650, 2016.
Alleyne, A., "A comparison of alternative obstacle avoidance strategies for vehicle control," Vehicle System Dynamics, vol. 27, No. 5-6, pp. 371-392, 1997.
Heydinger, G. J., et al., "Measured vehicle inertial parameters—NHTSAS data through Nov. 1998," SAE Technical Paper, Tech. Rep., 1999, 33 pages.

* cited by examiner

COLLISION IMMINENT STEERING CONTROL SYSTEMS AND METHODS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This disclosure relates to systems and methods of autonomously controlling a ground vehicle. More specifically, this invention relates to systems and methods of autonomously controlling a vehicle up to its dynamic limits of handling to avoid collisions.

2. Description of the Related Art

Next generation vehicles are able to exploit an increased amount of sensor information and embedded computing capabilities, which support more sophisticated active safety features. One such emerging feature is collision imminent steering (CIS). In CIS, the vehicle detects when a forward collision cannot be avoided by braking alone and implements a steering command to make, if possible, a lane change maneuver to avoid the obstacle. The effectiveness of a CIS system thus relies on the minimum distance required to safely change lanes, as such a maneuver pushes the vehicle to its dynamic and often nonlinear limits.

CIS is closely related to the broader area of obstacle avoidance, the early implementations of which use variations of reference trajectory controllers. Often, a reference trajectory is generated first as a straight line between two points on a topographic grid, presenting a start point and a desired trajectory to the end point. Then, obstacle avoidance is introduced as a quadratic state penalty function that a linear controller can minimize online. Alternatively, a reference trajectory can be generated initially as a minimum of a potential function where the distance to an obstacle relates to the potential energy. Then, for example, a low level proportional-integral-derivative (PID) controller can navigate the desired course. A key characteristic of this category of methods is that they cannot distinguish between a difficult trajectory and an infeasible trajectory that crashes into an obstacle. Additionally, they must use conservative trajectories to ensure the PID controller is capable of following the reference trajectory.

To ensure a controller can follow a reference trajectory at the dynamic limits of the vehicle, advanced controllers have been developed. One such approach uses an offline optimal trajectory planner to generate the theoretical fastest trajectory through a race course. With a known reference trajectory, an advanced steering controller, properly accounting for vehicle nonlinearity, can then navigate a passenger vehicle through a race course. While this method can push the vehicle toward its dynamic limits, the desired reference course is still required to be generated a priori. Further, tracking a trajectory that is optimized offline does not always exploit the full capability of the vehicle.

The high speeds achieved and sustained during highway driving present significant challenges to CIS. Any CIS maneuver that takes place at high speeds is generally limited by the space needed to maneuver, making aggressive lane change maneuvers difficult to constrain and predict, and limiting the effectiveness of current methods of CIS control.

SUMMARY OF THE INVENTION

The present disclosure provides systems and methods of using CIS control blended with nonlinear model predictive control to operate a vehicle up to its dynamic limits to avoid obstacles within the roadway. The systems and methods of vehicle control use nonlinear model predictive control framework to predict and optimize future vehicle behavior over a fixed or receding finite time horizon. Initial control commands are optimized over the prediction horizon, then applied to the vehicle. A new optimal control problem over a shifted finite time horizon is solved at the next time step using state feedback received from the vehicle. Using a one-level architecture, the nonlinear model predictive control framework can find an optimal path and the corresponding optimal steering commands simultaneously to maneuver a vehicle away from or around an obstacle.

It is therefore an advantage of the invention to provide a vehicle that has a steering mechanism with a collision imminent steering (CIS) control system. The steering mechanism is coupled to at least one wheel of the vehicle, and is adjustable to alter a vehicle trajectory relative to the roadway or surface below. The collision imminent steering control system includes a controller in electrical communication with the steering mechanism and is configured to adjust a steering sequence of the steering mechanism to alter the vehicle trajectory when an obstacle is detected at a distance from the vehicle less than a calculated safe braking distance. The controller simultaneously calculates a predicted optimal vehicle path around the obstacle and a steering sequence determined to follow the predicted optimal vehicle path around the obstacle using state feedback received by the controller.

In some aspects, the safe braking distance is a theoretical distance limit estimated by the controller using a measured vehicle velocity and a known coefficient of friction for a tire coupled to the wheel and traveling upon a roadway or surface below. The simultaneous calculation of the predicted optimal vehicle path around the obstacle and the steering sequence to follow the optimal vehicle path around the obstacle can be performed using a nonlinear model predictive control (MPC) framework. In some aspects, the nonlinear MPC framework has a single-level architecture. The nonlinear MPC framework can include modeling the vehicle and modeling a plurality of tires coupled to the vehicle to determine a future vehicle response. In some aspects, constraints are applied to the nonlinear MPC framework to define a safe maneuver around the obstacle (e.g., a maneuver that avoids collision with the detected obstacle). For example, the constraints can include a lane change threshold, a lane width, and an outer lane boundary value. In some aspects, the nonlinear MPC framework includes determining tire lateral force experienced by the vehicle's tires coupled to the roadway or surface below. This can be done using the Pacejka tire formula, for example.

The nonlinear MPC framework can use an incremental approach to determine a second optimal vehicle path around the obstacle and a second steering sequence to follow the second optimal vehicle path around the obstacle. The incremental approach can be defined by an integration time step, a control input length, and a time prediction horizon. In some aspects, the control input length is greater than the integration time step. The time prediction horizon can be between about 1 and about 10 seconds in some embodiments. For example, a time prediction horizon of about 2.5 seconds can be used.

In some aspects, the state feedback used to calculate the predicted optimal vehicle path around the obstacle includes vehicle position, vehicle yaw angle, vehicle velocity, vehicle yaw rate, and steering rate. The state feedback can be used in conjunction with control input that includes a front steering rate and a rear steering rate. In some aspects, the controller is part of a graphics processing unit (GPU).

A method of controlling a vehicle to avoid obstacles is also disclosed. The method comprises detecting an obstacle using a sensor coupled to the vehicle. Obstacles are detected and their distances from the vehicle are determined. The distances from the vehicle are compared to a calculated estimated safe breaking distance determined by a controller coupled to the vehicle. The method includes simultaneously calculating a predicted optimal vehicle path around the obstacle and a steering sequence determined to follow the predicted optimal vehicle path around the obstacle using state feedback received by the controller. The method then includes adjusting a steering mechanism of the vehicle to alter a vehicle trajectory based upon the steering sequence determined to follow the calculated predicted optimal vehicle path around the obstacle.

In some aspects, the state feedback used to calculate the new predicted optimal vehicle path around the obstacle includes a vehicle position, vehicle yaw angle, a longitudinal velocity of the vehicle, a lateral velocity of the vehicle, a yaw rate of the vehicle, a front steering angle of the vehicle, and a rear steering angle of the vehicle. The state feedback can be obtained using one or more sensors coupled to the vehicle, such as accelerometers, for example. In some aspects, the steps of simultaneously calculating a predicted optimal vehicle path around the obstacle and a steering sequence determined to follow the predicted optimal vehicle path around the obstacle using state feedback received by the controller and adjusting the steering mechanism of the vehicle to alter the vehicle trajectory based upon the steering sequence determined to follow the calculated predicted optimal vehicle path around the obstacle are repeated at a frequency of between about 2 and about 200 Hz.

A vehicle is also disclosed. The vehicle includes a plurality of wheels adjustably controlled by a steering mechanism used to determine a vehicle trajectory. A collision imminent steering control system comprising a controller is in electrical communication with the steering mechanism. The controller is configured to incrementally adjust the vehicle trajectory when an obstacle is detected, by a sensor coupled to the vehicle, at a distance from the vehicle less than an estimated safe braking distance. The controller incrementally adjusts the vehicle trajectory using the steering mechanism to follow a predicted optimal path around the obstacle and a steering sequence determined to follow the predicted optimal path around the obstacle calculated by the controller using state feedback.

These and other features, aspects, and advantages of the present invention will become better understood upon consideration of the following detailed description, drawings and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Before the present systems and methods are described, it is to be understood that the terminology used herein is for the purpose of describing particular embodiments only, and is not intended to limit the scope of the present invention.

It must be noted that as used herein and in the appended claims, the singular forms "a", "an", and "the" include plural references unless the context clearly dictates otherwise. As well, the terms "a" (or "an"), "one or more", and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. The terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
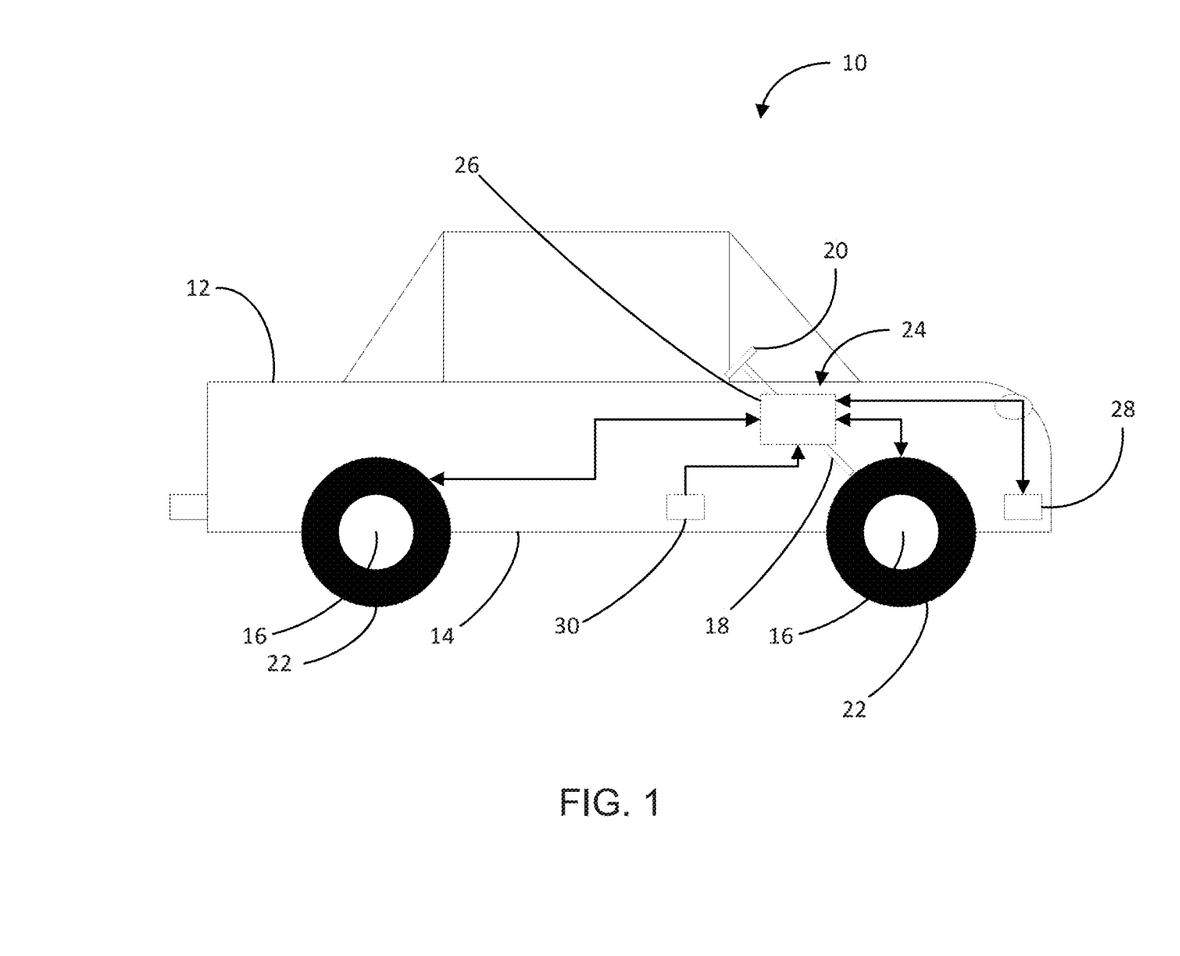
FIG. 1 is a schematic view of a vehicle having a collision imminent steering control system according to an embodiment of the disclosure.

FIG. 1 shows a vehicle 10 according to various embodiments of the disclosure. The vehicle 10 includes a body 12 received over a vehicle chassis 14. A plurality of wheels 16 are coupled to the chassis 14 and are movable relative to the body 12 using a steering mechanism 18 that is coupled to the chassis 14. The steering mechanism 18 can alter the trajectory of the vehicle 10 as it moves along a surface (e.g., a roadway 34, shown in FIG. 2) by rotating or steering the orientation of two or more of the wheels 16 relative to the body 12. In some embodiments, the steering mechanism 18 can include a steering wheel 20 to help an operator quickly and conveniently rotate the orientation of the wheels 16 relative to the body 12. Alternatively, the steering mechanism 18 can be electrically controlled, and can provide steering to both the front and rear wheels 16. In some aspects, separate steering mechanisms 18 are provided for the front wheels 16 and the rear wheels 16. Tires 22 are removably received around the wheels 16.

The vehicle 10 has a collision imminent steering (CIS) control system 24 electrically coupled to the steering mechanism 18. The CIS control system 24 can selectively autonomously control the vehicle 10 by altering the steering mechanism 18, for example. The CIS control system 24 can include a controller 26 in electrical communication with the steering mechanism 18. The controller 26 is configured to provide a steering sequence (e.g., a steering angle or steering rate) to alter the trajectory of the vehicle 10 as it drives over a surface, based upon feedback received from a variety of sensors placed throughout the vehicle 10. For example, an obstacle detection sensor 28 can be coupled to the body 12 of the vehicle 10. The obstacle detection sensor 28 can be placed in electrical communication with the controller 26, and can be positioned near a front of the vehicle 10 to provide a field of view in front of the vehicle 10. In some examples, the obstacle detection sensor 28 is a LIDAR sensor that can both detect the presence of an object and measure the distance to the detected object. Additionally, one or more motion sensors 30 can be placed about the vehicle 10 to detect various vehicle states, including vehicle velocity, yaw, position, or otherwise. In some embodiments, several motion sensors 30 can be used to detect vehicle velocity, yaw, and/or position, for example. In some embodiments, the information obtained by the motion sensors 30 can be fused, modified, and/or filtered prior to being used by the CIS control system 24.

Figure 2:
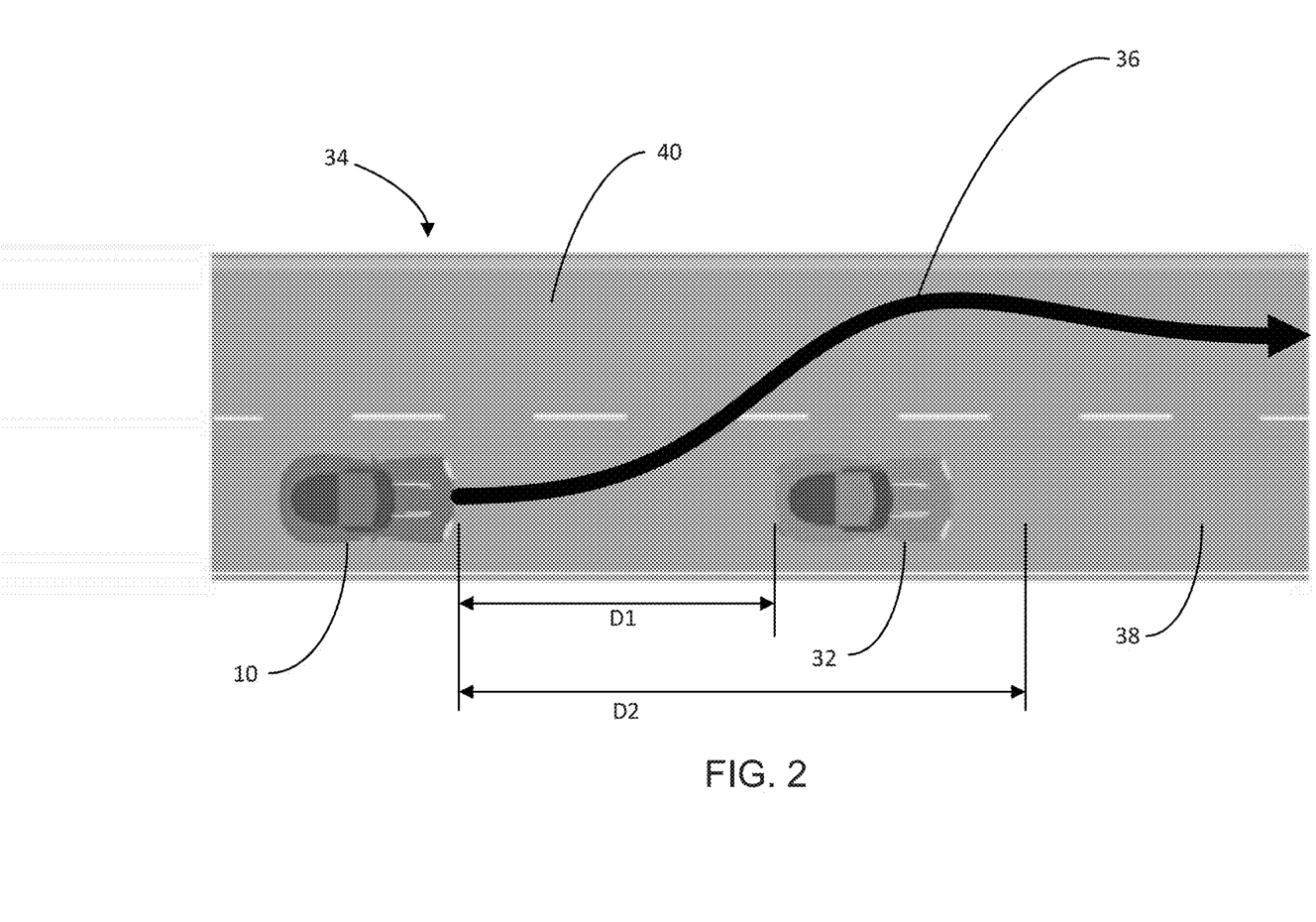
FIG. 2 is a top view of a vehicle performing a method of obstacle avoidance according to an embodiment of the disclosure.

With further reference to FIG. 2, the operation of the vehicle 10 and CIS control system 24 is shown in detail. During operation of the vehicle 10, certain obstacles 32 may become present within the vehicle path that require avoidance. For example, when the vehicle 10 is traveling down a roadway 34, a second car 32 could be stopped in front of the vehicle 10. Due to sudden stopping of the obstacle, distractions, inattentive driving, close following distance behind the obstacle 32, or the like, the braking system of the vehicle 10, alone, may not be able to stop the vehicle 10 before it contacts the obstacle 32. Accordingly, an obstacle avoidance maneuver 36 must be performed by the vehicle 10 to avoid a collision with the obstacle 32.

The obstacle avoidance maneuver 36 can be initiated when the obstacle detection sensor 28 detects the presence of an obstacle 32. In some embodiments, the obstacle avoidance maneuver 36 is initiated when an obstacle 32 is detected at a distance D1 that is less than the braking distance D2 required to stop the vehicle. During operation of the vehicle 10, the obstacle detection sensor 28 can continuously scan for obstacles in front of the vehicle 10. If an obstacle 32 is detected in front of the vehicle 10, the obstacle detection sensor 28 can measure and report the presence of the obstacle 32 in front of the vehicle 10, the distance D1 between the obstacle 32 and the vehicle 10, and the relative velocity between the vehicle 10 and the obstacle 32. Using equation (1), for example, the controller 26 can then calculate an estimated safe braking distance D2 required to completely stop the vehicle 10 (or reduce the relative velocity between the obstacle 32 and the vehicle 10 to zero).

$$D2 = \frac{V_0^2 - V_f^2}{2*\mu*g} \tag{1}$$

In equation (1), $V_0$ is the current velocity of the vehicle (as measured by one of the motion sensors 30, for example), $V_f$ is the final velocity or velocity of the obstacle as measured by the obstacle detection sensor 28, $\mu$ is the coefficient of friction, and g is the acceleration due to gravity. The coefficient of friction $\mu$ can be a measured value or can be stored in the vehicle 10, and can be accessed by the controller 26. For example, the controller 26 can have a default setting of $\mu=0.8$, which is a widely-accepted coefficient of friction value for standard tires on dry pavement. Although the formula for estimating safe braking distance D2 is provided, the safe braking distance D2 can also be determined in other ways. For example, the safe braking distance D2 can be determined by the controller 26 using data from past manufacturer testing or live data acquisition.

Using the estimated safe braking distance D2 needed to safely stop the vehicle and the measured distance D1 between the vehicle 10 and the obstacle 32, the controller 26 of the CIS control system 24 can continuously evaluate whether driving assistance is necessary to safely operate the vehicle 10. If the measured distance D1 between the vehicle 10 and the obstacle 32 is greater than the estimated safe braking distance D2, normal operation of the vehicle 10 can continue. If the measured distance D1 between the vehicle 10 and the obstacle 32 is measured to be less than or equal to the estimated safe braking distance D2, the CIS control system 24 can override the normal input (e.g., manual rotation of the steering wheel 20) to the steering mechanism 18, and can control and direct the vehicle through an obstacle avoidance maneuver 36 to prevent a collision.

Figure 3:
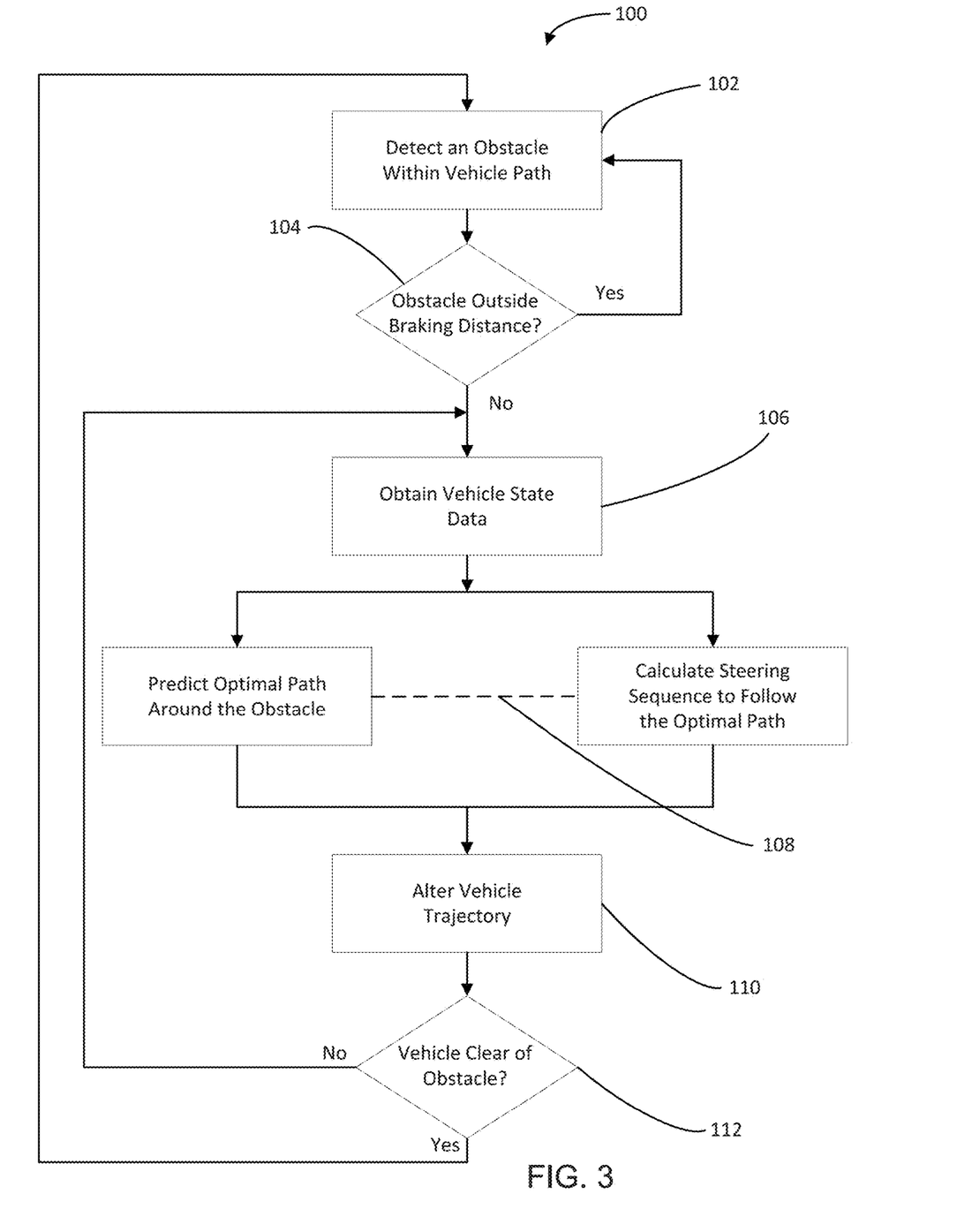
FIG. 3 is a process diagram detailing a method of controlling a vehicle to avoid obstacles.

With additional reference now to FIG. 3, the obstacle avoidance maneuver 36 initiated by the CIS control system 24 is explained. The obstacle avoidance maneuver 36 is defined by an objective function and a set of constraints derived from a roadway environment, as well as a vehicle stability analysis in terms of side slip to develop an optimization formulation for a lane change in minimum distance that maneuvers around the obstacle 32. To perform the lane change to avoid the obstacle 32 in minimal distance, the dynamic limits of the vehicle 10 can be exploited. The optimization formulation can be solved using a nonlinear model predictive control formulation repetitively solved over a fixed or receding horizon. The model predictive control algorithm discretizes and predicts future states in a way that ensures the control sequence generates state values that match the expected states, and the discretization is $C^2$ smooth for gradient-based optimization. Using the model predictive control algorithm, a control sequence and matching trajectory for a lane change in minimum distance can be obtained simultaneously without having a previously-defined reference trajectory.

The obstacle avoidance maneuver 36 is performed by CIS control system 24, which can use the method 100 to avoid an obstacle 32 detected within the vehicle 10 trajectory. As indicated previously, the obstacle detection sensor 28 scans the roadway 34 or other surface for obstacles 32 as the vehicle 10 travels. At step 102, an obstacle 32 is detected within the vehicle path, as defined by the vehicle's trajectory. The obstacle detection sensor 28 communicates the presence of the obstacle 32, the distance D1 between the vehicle 10 and the obstacle 32, and the relative velocity between the vehicle 10 and the obstacle 32 to the controller 26. If the controller determines that the obstacle is farther away from the vehicle 10 than the estimated minimum safe braking distance D2 at decision block 104, then the obstacle detection sensor 28 continues to scan for obstacles 32, and the CIS control system 24 does not adjust the steering mechanism 18.

If the obstacle 32 is detected closer to the vehicle 10 than the estimated minimum safe braking distance D2, the CIS control system 24 can override the steering mechanism 18 to perform an obstacle avoidance maneuver, such as the aggressive lane change maneuver 36 shown in FIG. 2. In order to avoid a collision with the obstacle 32, the controller 26 can calculate a set of future control inputs to direct the vehicle 10 through an obstacle avoidance maneuver 36 around the obstacle 32 in the shortest distance possible at step 108, using vehicle state data obtained (e.g., by sensors coupled to the vehicle 10 and in electrical communication with the controller 26) at step 106. Alternatively, instead of performing the maneuver in minimum distance, the controller 26 can calculate a set of future control inputs that safely avoid the obstacle by minimizing the maximum slip angle experienced by the tires of the vehicle 10. As detailed below, the obstacle avoidance maneuver 36 may include changing from a first lane 38 to a second, adjacent lane 40. As is shown in FIG. 3, step 108 includes simultaneous calculations of multiple quantities corresponding to future vehicle 10 behavior, including a predicted optimal path around the obstacle 32, as well as the steering sequence necessary to follow the optimal path around the obstacle 32. Based upon the calculations performed at step 108, the trajectory of the vehicle 10 is altered at step 110 to direct the vehicle 10 through the obstacle avoidance maneuver 36. To alter the vehicle 10 trajectory, the steering mechanism 18 can be adjusted based upon the steering sequence determined to follow the calculated predicted optimal path around the obstacle 32 produced at step 108. The calculations at step 108 can be repeated until the vehicle 10 detects that it has cleared the obstacle 32 at decision block 112.

To effectively avoid a collision, the obstacle avoidance maneuver 36 calculated and implemented by the controller 26 is constrained to operate within set parameters that ensure the vehicle 10 will avoid losing control and will not contact the obstacle 32 during the maneuver. Similarly, once the vehicle 10 has crossed the lane boundary, the vehicle 10 can be constrained to remain in the just-entered lane. In some examples, the path of the obstacle avoidance maneuver can be required to completely change lanes prior to passing the obstacle 32, which ensures that the vehicle 10 does not clip the obstacle 32 in passing. Additionally, the path of the obstacle avoidance maneuver can be constrained to not exceed the outer lane boundary of the lane 40 that the vehicle 10 changes into. By constraining the obstacle avoidance maneuver path to not exceed the outer lane boundary of the lane 40 that the vehicle 10 changes into, the vehicle 10 avoids driving off the roadway 34 entirely, which could also cause collisions with obstacles (not shown) entirely external from the roadway 34, as well as a potential loss of vehicle 10 control caused by loose gravel and the like beyond the roadway 34. Finally, the obstacle avoidance maneuver 36 can be constrained to ensure that the vehicle 10 stabilizes in the adjacent lane 40 once it has performed a complete lane change. This can prevent directional vehicle 10 movement too sudden or too extreme that could cause the vehicle to roll or slide out of control, which is advantageously avoided. An example of a successful obstacle avoidance maneuver 36 obeying these three constraints is shown through numerical simulation in FIG. 2 and is quantitatively illustrated by the graphs in FIGS. 6A, 6B, 6C, and 6D.

For purposes of clarity and understanding, example values have been provided in Table 1, below, that have been used to calculate and determine a successful obstacle avoidance maneuver 36 according to the constraints previously described. The values in Table 1 correspond to the vehicle parameters of a modern luxury sedan, such as a 2017 BMW 740i. The vehicle parameter values can be directly provided by the manufacturer's technical specification or derived from them, as needed for use in the modeling of the vehicle in the algorithm to determine the obstacle avoidance maneuver 36.

TABLE 1

| Vehicle Parameter Name | Parameter Symbol | Value |
|---|---|---|
| Vehicle Mass | m | 2041 kg |
| Weight Distribution | — | 51.4/48.6 F/R |
| Wheel Base | — | 3.2 m |
| Vehicle Width | — | 1.8 m |
| Front Wheel to CG Distance | $l_f$ | 1.56 m |
| Rear Wheel to CG Distance | $l_r$ | 1.64 m |
| Yaw Moment of Inertia | $I_{zz}$ | 4964 kg · m$^2$ |

These constraints can be quantified and placed into the model predictive control algorithm using known quantities. For example, the United States building code has established a minimum width for lanes 38, 40 of $y_{lane}$=3.7 meters, implying a lane 38, 40 half-width of 1.85 meters. In some embodiments, the vane parameter is dynamic, and can be adjusted independently when the width of the lanes 38, 40 changes. The vehicle 10 has either front-wheel steering, rear wheel steering, or four-wheel steering. The vehicle 10 can be modeled as a 3 degrees of freedom (3DoF) bicycle model with four wheel steering using the nonlinear Pacejka tire model, for example. This combined model provides a level of detail sufficient for model predictive control-based obstacle avoidance even at the dynamic limits. The use of four-wheel steering improves the maneuverability of the vehicle, and is already available in many luxury vehicle models. As will be explained, the same combined model can be used with standard two-wheel steering vehicles as well. To perform the obstacle avoidance maneuver 36, the combined vehicle model is used both as the plant model and the model predictive control model, as a virtual performance evaluation step.

The obstacle avoidance maneuver 36 is designed to change lanes in the shortest distance possible. The obstacle avoidance maneuver 36 can also be configured to change lanes in a way that minimizes the maximum slip. Because the combined model predicts the vehicle's 10 center of gravity position, the lane change criterion is adjusted to include the vehicle half width to avoid the vehicle body 12 from clipping the obstacle. The lane change threshold, $y_{threshold}$, can be set to 3.25 meters, corresponding to 1.85 meters for lane half width, plus 0.9 meters for vehicle half width, plus an additional 0.5 meters as a buffer. Similarly, the outer lane boundary, $y_{outer}$, can be set at 4.15 meters. The outer lane boundary value can correspond to 5.55 meters for one and a half lane widths, minus 0.9 meters for vehicle half width, minus an additional 0.5 meters as a buffer. Using these constraints, the vehicle 10 can be confined to the roadway 34 during the obstacle avoidance maneuver 36.

As a simplification to the obstacle avoidance maneuver 36, the CIS control system 24 can be modeled as having control over the steering mechanism 18, but not the throttle or braking systems of the vehicle 10. Accordingly, the CIS control system 24 can be assumed to modify a steering sequence and position of the vehicle 10, but not the vehicle speed. This allows the combined model to be modified to maintain constant longitudinal velocity, and allows all longitudinal forces in the vehicle frame to be simplified to zero, as they are significantly smaller than the lateral forces.

With these simplifications, the CIS control system 24 can be implemented as the vehicle model states x, control inputs u, and simplified vehicle dynamics, which are provided in equations (2), (3), and (4) below.

$$x = \begin{bmatrix} \text{global } x \text{ position, m} \\ \text{global } y \text{ position, m} \\ \text{vehicle yaw angle, rad} \\ \text{longitudinal velocity, m/s} \\ \text{lateral velocity, m/s} \\ \text{vehicle yaw rate, rad/s} \\ \text{front steering angle, rad} \\ \text{rear steering angle, rad} \end{bmatrix} = \begin{bmatrix} x \\ y \\ \psi \\ u \\ v \\ \omega \\ \delta_f \\ \delta_r \end{bmatrix} \quad (2)$$

$$u = \begin{bmatrix} \text{front steering rate, rad/s} \\ \text{rear steering rate, rad/s} \end{bmatrix} = \begin{bmatrix} \dot{\delta}_f \\ \dot{\delta}_r \end{bmatrix} \quad (3)$$

$$\frac{dx}{dt} = \begin{bmatrix} u\cos(\psi) - v\sin(\psi) \\ u\sin(\psi) + v\cos(\psi) \\ \omega \\ 0 \\ -u\omega + \dfrac{F_{y,r}\cos(\delta_r) + F_{y,f}\cos(\delta_f)}{m} \\ \dfrac{F_{y,f}\cos(\delta_f)l_f - F_{y,f}\cos(\delta_r)l_r}{I_{zz}} \\ \dot{\delta}_f \\ \dot{\delta}_r \end{bmatrix} \quad (4)$$

In equation (4) above, $F_{y,(f,r)}$ is the tire force in the lateral direction relative to the reference frames of the front and rear tires, respectively. Additionally, the global coordinate frame is aligned such that the x-axis is parallel to the lanes 38, 40, and the y-axis is perpendicular to the lanes 38, 40.

As discussed previously, the tire lateral force is calculated using the Pacejka tire formula, provided in equation set (5) below. The Pacejka tire formula captures the force relaxation at high slip angles, using various tire parameters and variables.

$$F_y = \mu F_z \sigma_y \quad (5)$$
$$\sigma_y = -\frac{V_y}{V_x}\sin\left(C\tan^{-1}\left(B\frac{V_y}{V_x}\right)\right)$$
$$V_x = u\cos(\delta) + (v + \omega l)\sin(\delta)$$
$$V_y = -u\sin(\delta) + (v + \omega l)\cos(\delta)$$

In one non-limiting example, the tire parameters and variables provided in Table 2, below, were used to determine the tire lateral force experienced by the vehicle 10 during the obstacle avoidance maneuver 36. The tire properties were chosen to represent a tire with maximum grip of 0.8 g, peak lateral force at 12 degrees slip, and 10% force relaxation at high slip. The parameter l in equation (5) is defined as $l_f$ for front wheel to CG distance and $-l_r$ for rear wheel to CG distance, in determining the tire longitudinal and lateral velocities for the front and rear wheels respectively.

TABLE 2

| Parameter | Symbol | Value |
|---|---|---|
| Coefficient of Friction | μ | 0.8 |
| Tire Property | B | 13 |
| Tire Property | C | 1.285 |
| Tire Longitudinal Velocity | $V_x$ | |
| Tire Lateral Velocity | $V_y$ | |

The provided equations (4) and (5) predict the nonlinear system dynamics of the vehicle 10 as it traverses the obstacle avoidance maneuver 36. The system dynamics of the vehicle 10 can be used to develop a model predictive control formulation for the CIS control system 24, which enables the optimized obstacle avoidance maneuver 36. The model predictive control implementation can use a direct shooting method solved using forward Euler integration, expressed in equation (6) below. In equation (6), $t_s$ is the time step.

$$x(t_{i+1}) = x(t_i) + t_s \frac{dx}{dt}\bigg|_{t=t_i} \quad (6)$$
$$x(t_0) = [0 \ 0 \ 0 \ u_0 \ 0 \ 0 \ 0 \ 0]^T$$

The model predictive control framework has two distinct phases. First, the dynamics are propagated forward, then the resulting vehicle trajectory is evaluated. The differential equations describing the vehicle dynamics do not have a closed form solution. Therefore, the model predictive control framework can solve the equations numerically using explicit integration points. The formulation disclosed herein incorporates the system dynamics constraints automatically in the forward Euler method, such that they are not explicitly defined in the optimization problem.

Piecewise constant control inputs are used to simulate modern automotive communication networks that use loop timing. The algorithm can solve for a series of constant front steering and rear steering rates where each pair is executed by the vehicle for a time length of $t_c$. The algorithm uses a prediction horizon having a length $t_h$, which can be a non-integer multiple of $t_c$. Additionally, the forward Euler method uses an integration time step of $t_s$, which should be (but does not have to be) an integer divisor of $t_c$. In the example provided, an integration time step of is =10 ms and a control input length of $t_c$=100 ms were chosen, and a 10 Hz loop time was used. Prediction lengths between about 1.00 seconds and about 10.00 seconds can be used in some embodiments. Based on numerical testing, a prediction horizon $t_h$=2.51 seconds was found to be successful for the parameters used in this example.

Using the above disclosed equations, the CIS control system 24 can be designed to either minimize the maximum lateral slip the vehicle experiences during the obstacle avoidance maneuver or minimize the x-distance (longitudinal) traveled when the vehicle 10 crosses into the next lane 40. In the example given below, the latter formulation is used. Because the x-distance is minimized, the CIS control system 24 can wait as long as possible before overriding manual input (e.g., by a human operator) from the steering mechanism 18 and altering the vehicle trajectory at step 108. Numerically, the discrete lane change event occurs at the vehicle's x-position when the vehicle's y-position exceeds $y_{threshold}$, where $y_{threshold}$ is the y-coordinate of the lane boundary that the vehicle needs to cross in order to change lanes. Because the model predictive control algorithm only tracks the vehicle's CG x-y trajectory at discrete integration points, it is unlikely for one of the integration points to fall exactly on $y_{threshold}$. Instead, the x-position when crossing the threshold is found through linear interpolation between the integration points before and after crossing, represented by $x_k$ and $x_{k+1}$, respectively. Accordingly, the objective function for the model predictive control optimization can be expressed as given by equation (7).

$$x_{obj}(x_k, x_{k+1}) = x_k + \frac{x_{k+1} - x_k}{y_{k+1} - y_k}(y_{threshold} - y_k) \quad (7)$$

Returning now to the tire model calculations, the lateral force of modern automotive tires relaxes at high slip angles. As a result, local minima occur that can be challenging for gradient based optimization. To avoid local minima when solving the model predictive control optimization function, constraints are implemented on the tire slip angle.

Figure 4:
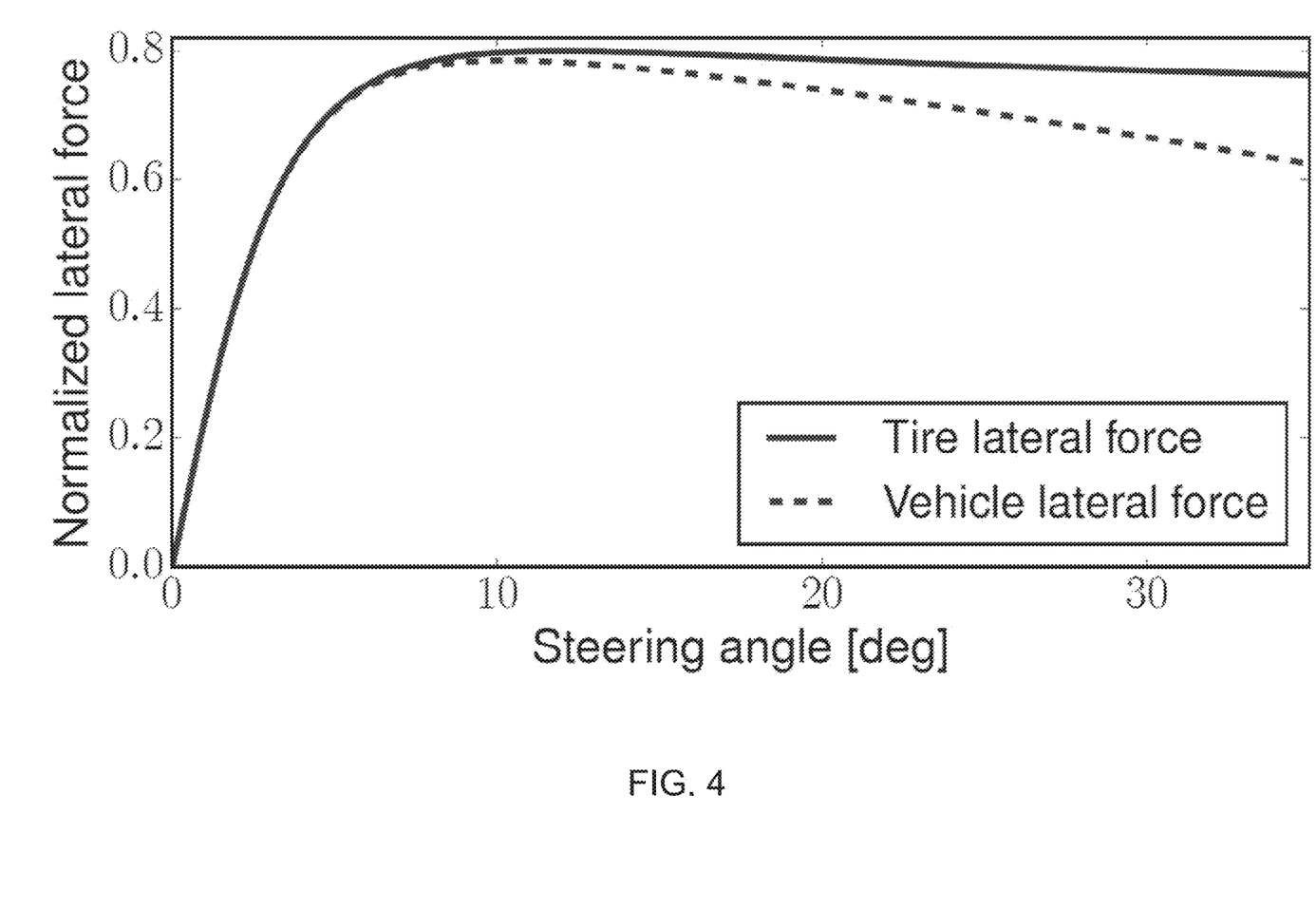
FIG. 4 is a plot of steering angle against normalized lateral force experienced by a vehicle and its tires traveling in a purely longitudinal direction.

FIG. 4 shows the normalized tire force plotted against the tire slip angle for pure longitudinal velocity. The front and rear tires are assumed to have the same normalized performance, but actual tire force experienced will vary due to differences in weight distribution. Only the lateral force was considered, and the longitudinal tire force was assumed to be zero. The normalized lateral force in the vehicle frame is plotted as well. The normalized lateral force is the tire lateral force rotated by $\cos(\delta)$. At small angles, the tire lateral force is nearly identical to the vehicle lateral force, but at high slip angles the vehicle lateral force decays faster than the tire lateral force.

Additionally, FIG. 4 shows that there are two local minima of the lateral forces. For $\delta \in [0°, 35°]$, the minimum lateral forces are shown to occur at the set endpoints, 0° and 35°. As a result, at high slip angles gradient-based optimization will have numerical difficulty. For example, if the tires 22 are at 20° steering angle, then they create a lateral force in positive y-direction, causing the vehicle to turn. If CIS control system 24 attempted to straighten the vehicle 10 (e.g., oriented parallel to the x-direction), then the CIS control system 24 would react to reduce the lateral force. However, the gradient information of the vehicle lateral force would indicate reducing lateral force is achieved by increasing the steering angle, which would cause the vehicle 10 to turn at an even sharper angle, rather than straightening out.

This causes a local minima where the optimizer would not command the steering angle to zero, which would be undesirable. Without any countermeasures, entering this local minimum is highly likely because the model predictive control algorithm is designed to push the vehicle to its dynamic limits. As a result, a new constraint is introduced to avoid local minima in the tire force. Although the steering angle and slip angle are equal in FIG. 4 because the vehicle is traveling purely straight ahead, these values may diverge when the vehicle experiences a non-zero lateral velocity and angular velocity.

Figure 5:
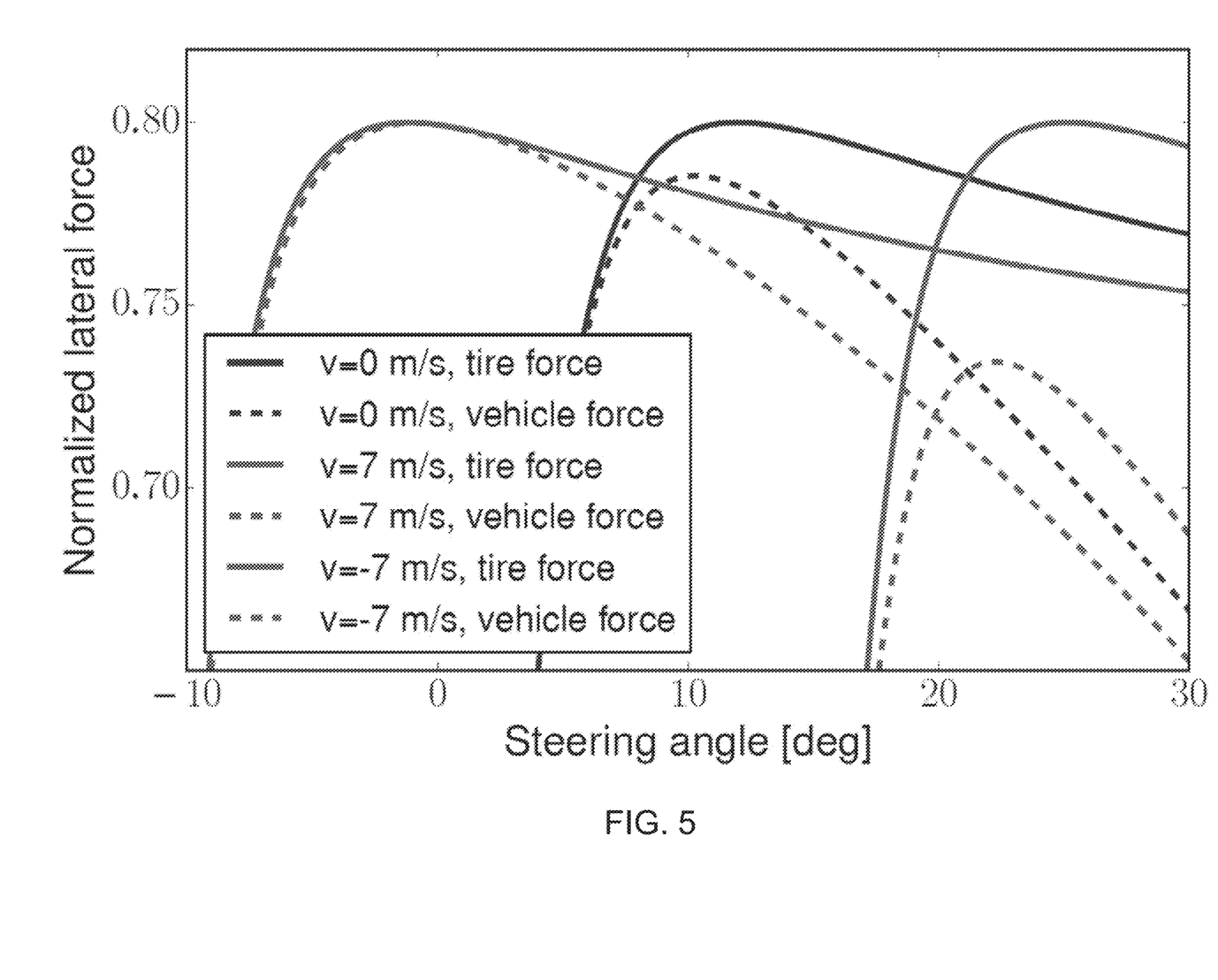
FIG. 5 is a plot of steering angle against normalized lateral force experienced by a vehicle in several different vehicle lateral velocities.

FIG. 5 shows differences in the tire and vehicle forces due to variations in the lateral velocity of the vehicle 10 that may be experienced in normal operations. The stable tire region is where $$\frac{dF_{vehicle}}{d\delta} > 0$$

because this is the region where the gradient information can return the steering wheels to neutral. As can be seen by the plots in FIG. 5, simply limiting the steering angle does not ensure the optimizer remains in the stable region. When lateral velocity is introduced, the tire force and vehicle force plots are translated and stretched. For given lateral and angular velocities, there is a neutral steering angle where the tires 22 do not generate lateral force. The stretching effect means limiting the steering angle of ±8° of the neutral steering angle does not ensure a stable tire region, either. When the vehicle is traveling straight forward, the difference in peak tire force and peak vehicle force is approximately 4°. However, when lateral velocity is introduced, the steering angle for peak vehicle force changes, and the difference between peak tire and vehicle force angles changes, as well.

Defining the tire stability constraint by $$\frac{dF_{vehicle}}{d\delta} > 0$$

ensures the steering angle is stable and that the optimizer can fully exploit the peak vehicle lateral force. However, numerical simulation of the lane change maneuver shows only moderate lateral velocity and angular velocity. Separate analysis of various combinations of lateral velocity and angular velocity show that limiting the slip angle to $\alpha_{peak}=8°$ maintains vehicle 10 stability. While this does not allow the optimizer to make maximum use of the available tire force, there are diminishing returns near the peak slip angle. 8° allows 98% of peak tire force and improves the computational cost. The appropriate $\alpha_{peak}$ value varies for each set of tire and vehicle parameters.

The slip angle is defined in equation (8), and the corresponding slip angle constraint is defined in equation (9).

$$\alpha = \delta - \tan^{-1}\left(\frac{v + \omega \cdot l}{u}\right) \quad (8)$$

$$\alpha(t_i) \leq \alpha_{peak} \forall t \in [t_0, t_h] \quad (9)$$

The slip angle constraint on the front and rear tires 22 is enforced at every integration point in the state trajectory. Pending the number of integration points used, there can be a significantly large number of constraints, which increases computational complexity. Alternatively, constraint aggregation methods can be used, such as a switching quadratic function. In general, a set of constraints enforced at each integration point is represented as a single constraint shown in equation (10) below.

$$g(\zeta, \zeta_{peak}) = \sum_{i=1}^{n} H(\zeta_i - \zeta_{peak})(\zeta_i - \zeta_{peak})^2 \quad (10)$$

This equation uses the Heaviside step function, H(x), which is zero for arguments below zero and one for arguments above zero. The switching aspect of this function allows the constraint to be a quadratic of the set of $\zeta$ that violate the $\zeta_{peak}$ parameter. Additionally, this constraint aggregation is $C^2$ smooth, which is well-suited for gradient-based optimization. Equation (10) is non-negative and equal to zero when all $\zeta$ states are below $\zeta_{peak}$. As a result, this constraint is posed as an equality constraint for numerical optimizer speed-up that also ensures that the angle does not exceed $\zeta_{peak}$.

As discussed previously, lane constraints are used to ensure that the vehicle 10 remains within the lane boundaries of the roadway 34 during an obstacle avoidance maneuver 36. Using the outer lane criteria and numerical values for the outer threshold derived from the lane and vehicle widths along with the global coordinate frame's alignment with the lanes 38, 40, the outer lane boundary constraint can be enforced purely based on the vehicle's 10 y-position. The lane constraint can be represented by equation (11) below.

$$y(t_i) \leq y_{outer}, \forall t_i \in (t_0, t_h] \quad (11)$$

Using the same constraint aggregation as the slip angle, the lane boundary constraint can be implemented following equation (10). In some embodiments, the obstacle avoidance maneuver 36 will not be initiated by the CIS control system 24 unless the candidate trajectory satisfies all three of the lane-change criteria at the outset.

Once the obstacle avoidance maneuver 36 has been completed (e.g., the vehicle 10 has safely navigated around the obstacle 32), it is important for the final trajectory to return to a stable trajectory in the next lane 40. A candidate trajectory is considered stable if the vehicle is traveling purely straight ahead (e.g., parallel to the x-axis) in the next lane at the end of the prediction horizon. Specifically, a stable trajectory is defined by equation (12).

$$x_{stable} = [x y_{lane} 0 u_0 0 0 0 0]^T \quad (12)$$

The stable state defined by equation (12) does not put any constraints on the terminal x-position. This implies that the optimizer does not seek to adjust the final x-position, which is consistent with the evasive maneuver. The optimizer only looks to reduce the x-position when crossing the obstacle, not the terminal x-position. Matching the remaining seven states enforced at the final integration step are introduced as seven individual equality constraints.

Physical limitations of the steering mechanism 18 are also taken into account by the CIS control system 24 and are constrained in the algorithm accordingly. Specifically, the front and rear wheels 16 are both deflection and rate limited. Typical front wheels have a travel range of ±35°, implying $\delta_{front,max}=35°$. The rate limits can be determined by the physical limits of the ability of the steering mechanism to turn the wheels. This could be easily determined by one of skill in the art.

Rear wheels in active rear steering vehicles are not consciously controlled by the driver, but rather by an on-board controller (e.g., controller 26) that manages a drive-by-wire system. Active rear steering equipped vehicles typically have smaller ranges of motion on the rear wheels. For example, the range of motion for rear wheels can be approximately ±10° with a lower steering rate of approximately 0.6 rad/s. This provides a $\delta_{rear,max}=10°$ and $\dot{\delta}_{rear,max}=0.6$ rad/s. In vehicles without rear steering capabilities, the CIS algorithm can set the rear steering rate at 0 rad/s.

Using the constraints defined herein and incorporating them into the previously defined objective function, the optimization problem can be set up in equation (13). The constraint on control rate does not use the same constraint aggregation in equation (10) because this is a linear constraint on the design variable and is commonly referred to as bounds in optimization.

$$\min x_{obj}(x_k, x_{k+1})$$

$$\text{subject to } g(y, y_{outer}) = 0$$

$$g(\alpha_{front}, \alpha_{peak}) = 0$$

$$g(\alpha_{rear}, \alpha_{peak}) = 0$$

$$g(\delta_{front}, \delta_{front,max}) = 0$$

$$g(\delta_{rear}, \delta_{rear,max}) = 0$$

$$x(t_h)_i - (x_{stable})_i = 0 \forall i \in [2,8]$$

$$|\dot{\delta}_f(t_i)| \leq \dot{\delta}_{front,max}$$

$$|\dot{\delta}_r(t_i)| \leq \dot{\delta}_{rear,max} \quad (13)$$

The following Example has been presented in order to further illustrate the invention and is not intended to limit the invention in any way.

Example

Figure 6A:
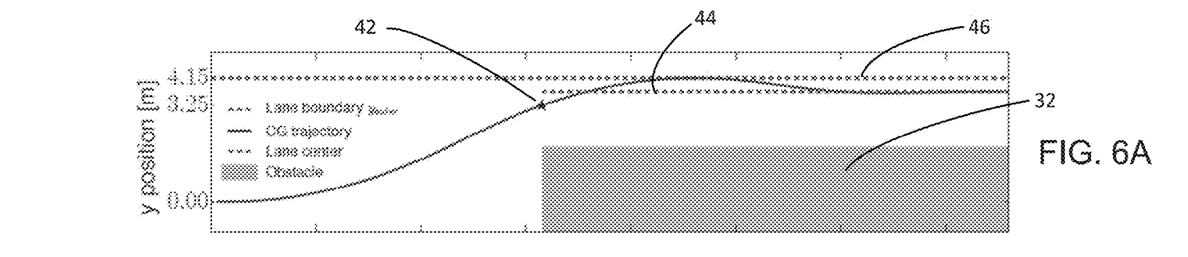
FIG. 6A is a plot of the y-position of the vehicle's center of gravity against the x-position of the vehicle during an obstacle avoidance maneuver around an object, as shown in FIG. 2.

Equation (13) was transcribed into Python programming language for numerical simulation, with $\alpha_{peak}$ set at 8°, based on the limits for peak slip angle discussed previously. For this example, the rate limit was set according to how quickly a human driver is able to traverse three complete rotations of the steering wheel 20, spanning a full left to full right sequence. A human driver can do this in approximately 1.0 second. The corresponding 70° of wheel rotation gives an approximate allowable steering rate of $\dot{\delta}_{front,max}=1.2$ rad/s. Various vehicle 10 states were tracked while the vehicle 10 performed an obstacle avoidance maneuver 36, as shown in FIGS. 6A-6D. Specifically, FIG. 6A shows the x-y trajectory of the vehicle's 10 center of gravity as it travels around an obstacle 32 that blocks the lane. The obstacle 32 is fixed at a starting position x=32 meters from the vehicle 10. The star 42 on the trajectory indicates the crossing of $y_{threshold}$. After clearing the obstacle, the center line 44 of the next lane 40 is plotted to show the stable trajectory. Additionally, the outer lane threshold 46 is included to demonstrate that the trajectory of the obstacle avoidance maneuver 36 comes close to the limit, but does not cross, as required by one of the constraints of the objective function.

Figure 6B:
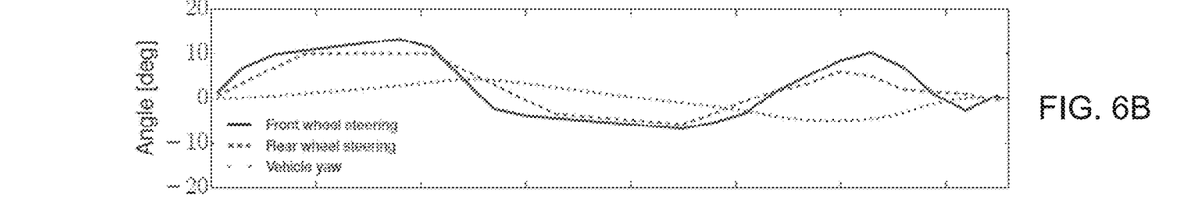
FIG. 6B is a plot of steering angle and vehicle yaw angle against the x-position of the vehicle as the vehicle performs the obstacle avoidance maneuver of FIG. 2.
Figure 6C:
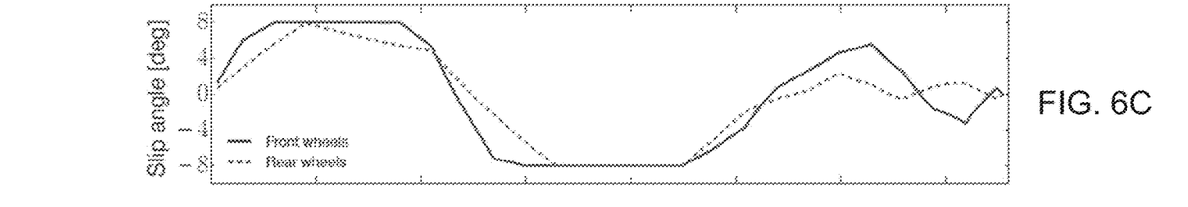
FIG. 6C is a plot of the slip angle of the front and rear wheels against the x-position of the vehicle as the vehicle performs the obstacle avoidance maneuver of FIG. 2.

FIG. 6B shows the steering angle of the front and rear tires 22, as well as yaw angle, plotted against the x-position of the obstacle avoidance maneuver 36 trajectory. When the obstacle is first detected at step 102 and is determined to be closer to the vehicle 10 than the safe braking distance at decision block 104 of FIG. 3, the vehicle 10 makes an aggressive left turn to initiate the obstacle avoidance maneuver 36. The constraints placed on the CIS control system 24 algorithm vary the steering angle to maintain a desired front and rear slip angle. The plot in FIG. 6C tracks closely with FIG. 6B, and shows the instantaneous slip angle on the front and rear tires. The algorithm attempts to push the tires to the peak lateral force as quickly as possible in the trajectory, then turns back to avoid exceeding the lane boundary that constrains the trajectory.

Figure 6D:
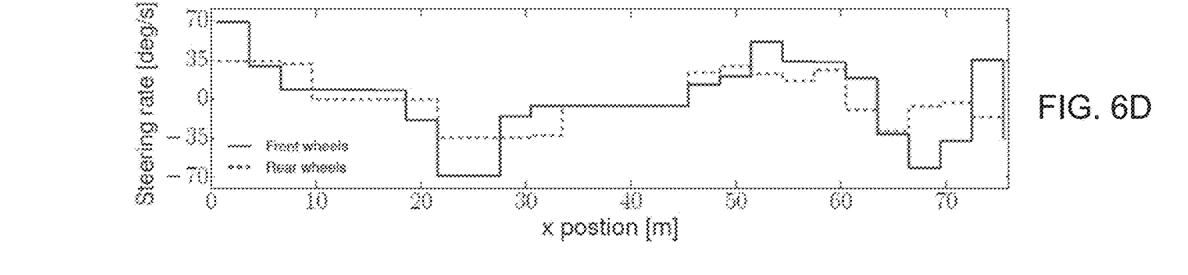
FIG. 6D is a plot of the front and rear wheel steering rate against the x-position of the vehicle as it performs the obstacle avoidance maneuver of FIG. 2.

FIG. 6D shows the control input for each time interval $t_c$. In this particular example, the steering angle and rate limits on the rear wheel steering command cause the rear steering system to be a limiting factor of the vehicle's 10 ability to maneuver around an obstacle 32 quickly. However, it is feasible that the vehicle 10 performance could be improved by improving the capabilities of the rear steering system, increasing the steering rate limit, and other factors known to one of skill in the art to affect vehicle handling using the proposed algorithm and vehicle model.

Using the example numbers provided above in Tables 1 and 2 and a vehicle traveling 30 m/s (67 mph), the CIS control system 24 was able to safely change lanes in a distance of 31.0 meters, as opposed to the 57.3 meters required by braking alone. By this result, there is 26.3 meters of travel after which the vehicle cannot brake in time, but can swerve safely to avoid a collision with the obstacle 32.

The optimal solution and the expected response from a human driver vary in a number of ways. Of particular note is the difference in timing as to when the vehicle 10 initiates the first turn to the right. In the optimal vehicle avoidance maneuver, the vehicle 10 begins to turn to the right prior to even clearing the obstacle 32. This may seem counterintuitive to the average human driver who may, as a panic reaction, hold the left turn until the obstacle 32 is cleared. The optimizer does not hold the left turn because continued left turning would eventually cause the state trajectory to push beyond the outer lane boundary, violating the constraints of the algorithm. Because the optimizer looks forward and appropriately balances future state trajectory, the optimizer is likely to outperform a common driver or distracted driver.

Figure 7:
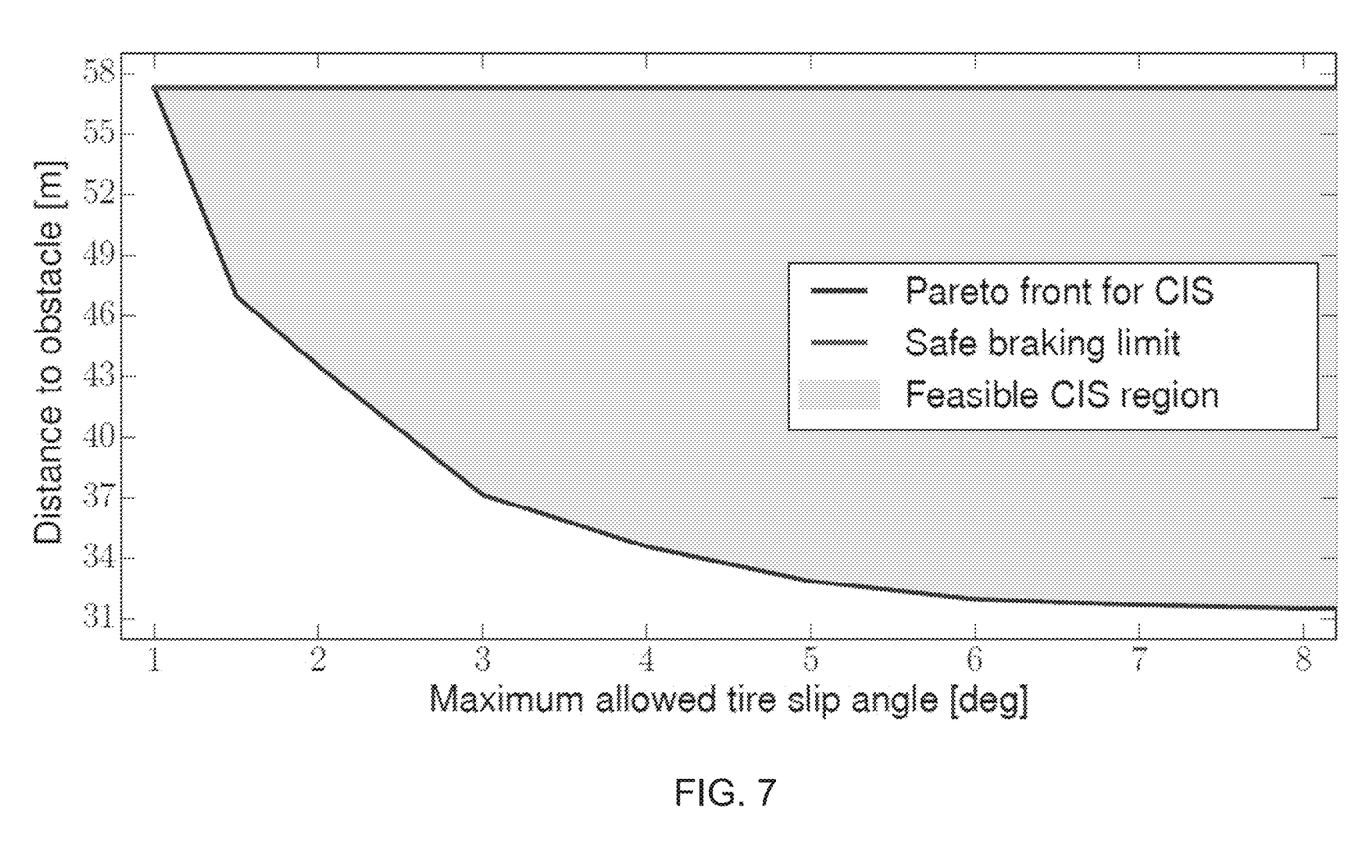
FIG. 7 is a plot demonstrating the nonlinear relationship between maximum allowable tire slip angle and the maximum distance to an obstacle required for the vehicle to change lanes in an obstacle avoidance maneuver.

The slip angle plot, shown in FIG. 7, can be used as a measure of the aggressiveness of the obstacle avoidance maneuver 36. Because higher slip angles generate higher lateral forces, a direct trade-off in allowable slip angle versus distance to clear an obstacle 32 is present within the algorithm. Lower slip angles cannot initiate the vehicle to turn as quickly or aggressively as high slip angles can, and therefore the optimal path length varies depending on the maximum slip angle that is set in the algorithm. By varying the peak allowable slip angle and reevaluating equation (13), the Pareto front in FIG. 7 was produced. The Pareto front establishes that a near-asymptotic relationship exists between the maximum allowable slip angle and the safe lane change distance as the slip angle increases beyond about 8°. Even at smaller maximum allowable slip angles, however, the distance to clear the obstacle using the CIS control system 24 algorithm outperforms limit braking alone. Accordingly, the maximum allowable slip angle of 8° was chosen in this example to provide the necessary vehicle 10 performance. Other values (e.g., between about 1° and about 12°) could be chosen as well.

Using the above-disclosed CIS control system 24 algorithm, a vehicle 10 can avoid obstacles 32 that could not otherwise be avoided using braking alone. The CIS algorithm formulated as a nonlinear model predictive control problem can allow the vehicle 10 to change highway lanes in the shortest distance possible, while retaining vehicle control. The specific constraints on the environment ensure that an optimal solution is collision free and avoids crossing the outer lane boundary. Constraints are used to address the nonlinearity of tire forces, and help avoid local minima during the optimization solution stage. The resulting optimal trajectory changes lanes in a distance significantly shorter than limit braking, which demonstrates that a window exists where the vehicle cannot simply brake to avoid collision, but can swerve to safely change lanes and avoid collision.

The gradient-based optimization used in the nonlinear model predictive control algorithm can outperform a human driver. A model of the vehicle is used to predict and optimize future vehicle behavior over a receding finite time horizon. The initial portion of the control commands optimized over the prediction horizon can be applied to the vehicle, while a new control problem over a shifted finite time horizon is solved at the next time step using the state feedback received from the vehicle. The CIS control algorithm adopts a one-level architecture the used model predictive control framework to find an optimal path and the corresponding optimal steering commands simultaneously. The algorithm exploits the dynamic limits of the vehicle by incorporating nonlinear tire models to predict the future vehicle response. In some aspects, the CIS control algorithm can be implemented on a graphics processing unit (GPU) for parallel computer toward real-time implementation.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A vehicle comprising:
   a steering mechanism coupled to a wheel of the vehicle and adjustable to alter a vehicle trajectory; and
   a collision imminent steering control system, the collision imminent steering control system comprising a controller in electrical communication with the steering mechanism and configured to adjust a steering sequence of the steering mechanism to alter the vehicle trajectory when an obstacle is detected at a distance from the vehicle less than an estimated safe braking distance,
   wherein the controller simultaneously calculates a predicted optimal vehicle path around the obstacle and a steering sequence to follow the predicted optimal vehicle path around the obstacle at a first time point using state feedback received by the controller, the controller further configured to use an incremental approach to simultaneously determine a second optimal vehicle path around the obstacle and a second steering sequence to follow the second optimal vehicle path around the obstacle at a second time point using state feedback received by the controller.

2. The vehicle of claim 1, wherein the safe braking distance is a theoretical distance limit estimated using a vehicle velocity and a known coefficient of friction for a tire coupled to the wheel and traveling over a surface.

3. The system of claim 1, wherein the controller is configured to ensure that the vehicle is traveling straight ahead after navigating around the obstacle.

4. The vehicle of claim 1, wherein the controller is part of a graphics processing unit.

5. The vehicle of claim 1, wherein the state feedback used to calculate the predicted optimal vehicle path around the obstacle and the steering sequence to follow the predicted optimal vehicle path around the obstacle includes vehicle position, vehicle yaw angle, vehicle velocity, vehicle yaw rate, and steering rate.

6. The vehicle of claim 1, wherein the simultaneous calculation of the predicted optimal vehicle path around the obstacle and the steering sequence to follow the optimal vehicle path around the obstacle is performed using a nonlinear model predictive control framework.

7. The vehicle of claim 6, wherein the nonlinear model predictive control framework has a single-level architecture.

8. The vehicle of claim 6, wherein the nonlinear model predictive control framework includes modeling the vehicle and modeling a plurality of tires coupled to the vehicle to determine a future vehicle response.

9. The vehicle of claim 8, wherein constraints are applied to the nonlinear model predictive control framework to define a safe maneuver.

10. The vehicle of claim 9, wherein the constraints include a lane change threshold, a lane width, and an outer lane boundary value.

11. The vehicle of claim 6, wherein the nonlinear model predictive control framework includes determining tire lateral force experienced by tires coupled to the vehicle.

12. The vehicle of claim 11, wherein the tire lateral force is determined using a Pacejka tire formula.

13. The vehicle of claim 6, wherein the nonlinear model predictive control framework uses the incremental approach to simultaneously determine the second optimal vehicle path around the obstacle and the second steering sequence to follow the second optimal vehicle path around the obstacle, the incremental approach being defined by an integration time step, a control input length, and a time prediction horizon.

14. The vehicle of claim 13, wherein the state feedback is used in conjunction with control input including a front steering rate and a rear steering rate.

15. The vehicle of claim 14, wherein the control input length is greater than the integration time step.

16. The vehicle of claim 15, wherein the time prediction horizon is between about 1 and about 10 seconds.

17. The vehicle of claim 16, wherein the time prediction horizon is about 2.5 seconds.

18. A method of controlling a vehicle to avoid obstacles, the method comprising:
   detecting an obstacle using a sensor coupled to the vehicle, the obstacle being detected to be located at a distance from the vehicle less than an estimated safe braking distance determined by a controller;
   simultaneously calculating a predicted optimal vehicle path around the obstacle and a steering sequence determined to follow the predicted optimal vehicle path around the obstacle using feedback received by the controller; and
   adjusting a steering mechanism of the vehicle to alter a vehicle trajectory based upon the steering sequence determined to follow the calculated predicted optimal vehicle path around the obstacle, wherein an incremental approach is used to simultaneously determine a second optimal vehicle path around the obstacle and a second steering sequence to follow the second optimal vehicle path around the obstacle using state feedback received by the controller.

19. The method of claim 18, wherein the state feedback used to calculate the predicted optimal vehicle path around the obstacle and the steering sequence determined to follow the predicted path around the obstacle includes a vehicle position, vehicle yaw angle, a longitudinal velocity of the vehicle, a lateral velocity of the vehicle, a yaw rate of the vehicle, a front steering angle of the vehicle, and a rear steering angle of the vehicle.

20. The method of claim 18, wherein the step of simultaneously calculating a predicted optimal vehicle path around the obstacle and a steering sequence determined to follow the predicted optimal vehicle path around the obstacle using state feedback received by the controller and adjusting the steering mechanism of the vehicle to alter the vehicle trajectory based upon the steering sequence determined to follow the calculated predicted optimal vehicle path around the obstacle are repeated at a frequency of between about 2 and 200 Hz.

21. A vehicle comprising:
   a plurality of wheels adjustably controlled by a steering mechanism used to determine a vehicle trajectory; and
   a collision imminent steering control system comprising a controller in electrical communication with the steering mechanism, the controller being configured to incrementally adjust the vehicle trajectory when an obstacle is detected, by a sensor coupled to the vehicle, at a distance from the vehicle less than an estimated safe braking distance;
   wherein the controller incrementally adjusts the vehicle trajectory using the steering mechanism to follow a predicted optimal path around the obstacle and a steering sequence determined to follow the predicted optimal path around the obstacle calculated by the controller using real-time feedback.

* * * * *

UNITED STATES PATENT AND TRADEMARK OFFICE
CERTIFICATE OF CORRECTION

PATENT NO. : 10,836,383 B2
APPLICATION NO. : 15/971318
DATED : November 17, 2020
INVENTOR(S) : Tulga Ersal et al.

It is certified that error appears in the above-identified patent and that said Letters Patent is hereby corrected as shown below:

In the Specification

Column 8, Line 28, "the vane parameter" should be --the $y_{lane}$ parameter--.

Signed and Sealed this
Fifth Day of January, 2021

Andrei Iancu
*Director of the United States Patent and Trademark Office*